Patented May 6, 1924.

1,492,578

UNITED STATES PATENT OFFICE.

JOSEF PERINO, OF SEWICKLEY, AND ROBERT DEY O'NEIL AND FRANK GALBRAITH GRAMM, OF CORAOPOLIS, PENNSYLVANIA, ASSIGNORS TO THE VULCAN DETINNING COMPANY, OF SEWAREN, NEW JERSEY, A CORPORATION OF NEW JERSEY.

OPAQUING COMPOSITION FOR ENAMELING MIXTURES AND PROCESS OF MAKING SAME.

No Drawing. Application filed December 6, 1920. Serial No. 428,563.

*To all whom it may concern:*

Be it known that JOSEF PERINO, a citizen of Germany, residing at and whose post-office address is No. 614 Nevin Avenue, Sewickley, Allegheny County, and State of Pennsylvania; ROBERT DEY O'NEIL, a citizen of the United States, residing at and whose post-office address is No. 1620 Vance Avenue, Coraopolis, Allegheny County, State of Pennsylvania, and FRANK GALBRAITH GRAMM, a citizen of the United States, residing at and whose post-office address is No. 846 Sixth Ave., Coraopolis, Allegheny County, State of Pennsylvania, have invented certain new and useful Improvements in Opaquing Compositions for Enameling Mixtures and Processes of Making Same; and we do hereby declare the following to be a full, clear, and exact description of the invention, such as will enable others skilled in the art to which it appertains to make and use the same.

The present invention relates to certain new and useful improvements in opaquing compositions for enameling mixtures and the like, and also to certain new and useful improvements in the process of making the same.

It is well known that, by treating stannate liquors with carbonic acid, or with the bicarbonate of an alkali metal, a hydrated tin oxide of an extremely fine and smooth texture is precipitated. Even after the most careful washing of the precipitate, either with cold water or hot water, the tin oxide retains from three to five per cent alkali. Experimental attempts have been made heretofore to utilize, for enameling purposes, such an alkali-containing hydrated tin oxide, but without practical success.

The precipitated hydrated tin oxide referred to is in a state of extremely fine subdivision, and its covering capacity is in direct proportion to the fineness and homogeneous distribution of the tin oxide particles. The physical advantage incident to this covering capacity is, however, counteracted by the greater chemical reactivity of the tin oxide combined with alkali, which latter tends to dissolve the finely subdivided particles of tin oxide in the silicate mixtures of the enamel during the melting process, in the form of a more or less transparent glass.

Furthermore, the opaquing power of such alkali-containing hydrated tin oxide is dependent upon and is influenced by the composition of the various enamel mixtures and the special treatment carried out in enameling operations, and it has been found that a satisfactory result cannot be assured on account of the unknown factors which influence and complicate the "physico-chemical" relations of the various constituents of the enameling mixture. Moreover, the alkali content of the tin oxide diminishes the gloss of the enamel to a marked degree.

The main purpose of the present invention is to provide an opaquing composition for enameling mixtures, consisting of an alkali-containing tin oxide with an agent which modifies said alkali-containing tin oxide during the melting of the enameling mixture in such manner that the alkali becomes an integral part of the enamel glass and so that the tin oxide will be liberated without being dissolved or becoming transparent.

We have found that silica is a very efficient agent for thus neutralizing the otherwise deleterious action of the alkali, in that silica reacts with the alkali to form an integral part of the enamel, leaving the tin oxide finely and homogeneously distributed throughout the mass. The tin oxide and the silica may be in any available form,—either hydrated or dehydrated.

A further object of the invention is to provide a process of producing an opaquing composition of the character described, wherein the tin oxide and the modifying reactive agent are precipitated together from a mixed solution of stannate and water glass.

The silica may be mixed with the alkali-containing tin oxide in any suitable manner, but that which we prefer for obtaining a mixture of silica with hydrated tin oxide is as follows: The stannate solution is mixed with an adequate amount of water glass solution and the resultant liquor is treated with carbonic acid or with alkali bicarbonate until the entire amount of tin oxide and silica is precipitated. In this manner, the silica, in a precipitated form, is intimately incorporated with the hydrated tin oxide.

The amount of silica to be incorporated with the tin oxide, in order to produce the best results, will depend, of course, upon the alkali content of the tin oxide and the special composition of the enameling mixture used. From two to six per cent $SiO_2$ by weight gives very satisfactory results, but the percentage may be varied according to special requirements and practice, as will be clear to those skilled in the art. The precipitated silica and tin oxide are filtered, washed and dried, and no other treatment or operation is necessary to prepare them for use, inasmuch as a very reactive silica is precipitated from the water glass solution by carbonic acid or an alkali bicarbonate.

The ingredients may be mixed in some other manner than by simultaneous precipitation. For example, the desired amount of very finely divided anhydrous silica may be suspended in a stannate solution and this mixture treated with a precipitant of tin oxide or of its hydrate; or tin oxide and silica, both dehydrated, may be mechanically mixed together; or dehydrated tin oxide may be suspended in a silicate solution and this mixture treated with a precipitant of silica. Thus, either the silica or the tin oxide, or both present in the mixture may be either hydrated or dehydrated.

A very efficient mixture may contain, by weight, up to 6% of alkali; up to 10% of water; and up to 6% of silica; but these proportions are not absolutely essential and may be varied.

We have also found that an improved result is obtained, particularly in regard to the gloss of the enamel, if sodium chloride be added to the tin oxide silica composition, the following proportions being very efficient: Up to 6%, by weight, of silica; up to 6%, by weight of alkali; up to 10% by weight of water; and up to 1½% by weight of sodium chloride. These proportions may be somewhat varied without departing from the spirit of the invention.

More specifically, the following composition has given very satisfactory results:

| | |
|---|---|
| $SnO_2$ | 83.5 |
| $H_2O$ | 7.9 |
| $SiO_2$ | 3.4 |
| $Na_2O$ | 3.7 |
| $NaCl$ | 1.0 |

During the melting of the enameling mixture on the ware, the silica of the opaquing composition combines with the alkali contained in the tin oxide, and the tin oxide is distributed uniformly in the enamel as solid particles, thereby developing great opaquing power. In other words, the alkali becomes, in effect, an integral part of the enamel glass, and the tin oxide is liberated without being dissolved, or becoming transparent. It will, of course, be obvious that other ways of producing and admixing silica may be employed, for rendering the alkali-containing tin oxide (hydrated or dehydrated) effective and reliable as an opaquing agent for enameling mixtures. The invention is not limited, therefore, to the specific ways for producing such admixture hereinbefore described.

By reactive silica as used throughout this specification and appended claims, we mean silicon dioxide in a very finely divided state, such as is obtained by precipitation, and which is in a form such as will readily react with the alkali of the alkali-containing tin oxide.

What we claim is:—

1. An opaquing composition for enameling mixtures, comprising an alkali-containing tin oxide and reactive silica.

2. An opaquing composition for enameling mixtures, comprising an alkali-containing hydrated tin oxide and reactive silica.

3. An opaquing composition for enameling mixtures, comprising alkali-containing tin oxide, reactive silica, and sodium chloride.

4. An opaquing composition for enameling mixtures, comprising alkali-containing tin oxide with from two per cent to six per cent by weight of silica.

5. An opaquing composition for enameling mixtures, comprising tin oxide containing up to 6% of alkali, up to 10% of water, and up to 6% of silica.

6. An opaquing composition for enameling mixtures, comprising tin oxide containing up to 6% of alkali, up to 10% of water, up to 6% of silica, and up to 1 and ½% of sodium chloride.

7. An opaquing composition for enameling mixtures, containing, by weight, substantially 83.5 per cent of $SnO_2$; 7.9 per cent $H_2O$; 3.4 per cent $SiO_2$; 3.7 per cent $Na_2O$; and 1.0 per cent $NaCl$.

8. The process of producing an opaquing composition for enameling mixtures, comprising precipitating tin oxide and silica, together, from a mixed solution of stannate and water glass.

9. The process of producing an opaquing composition for enameling mixtures, comprising precipitating tin oxide and silica, together, from a mixed solution of stannate and water glass by carbonic acid.

10. The process of producing an opaquing composition for enameling mixtures, comprising precipitating tin oxide and silica, together, from a mixed solution of stannate and water glass by carbonic acid derived from the introduction of an alkali bicarbonate into the solution.

In witness whereof we hereunto affix our signatures.

JOSEF PERINO.
ROBERT DEY O'NEIL.
FRANK GALBRAITH GRAMM.